UNITED STATES PATENT OFFICE.

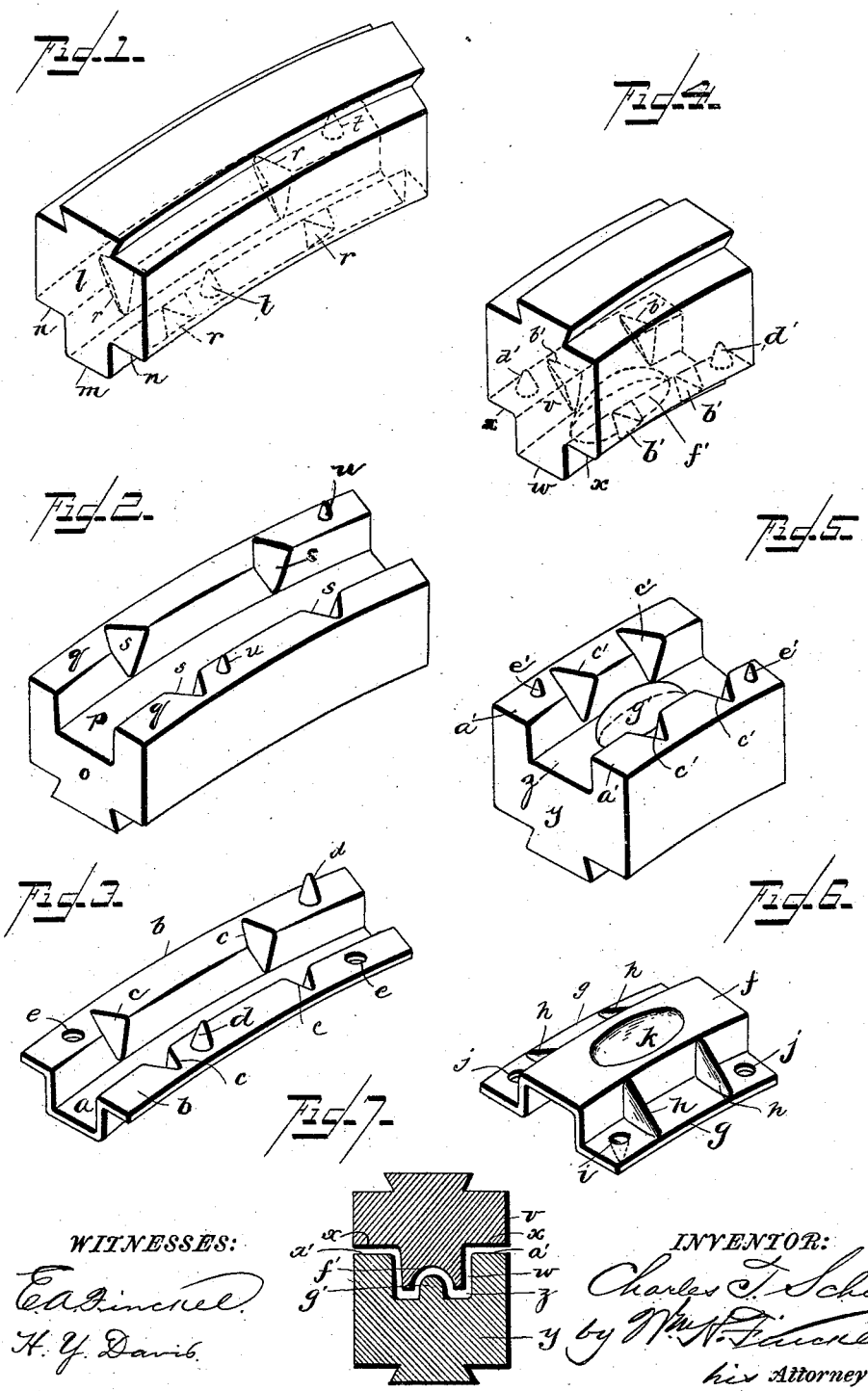

CHARLES T. SCHOEN, OF PHILADELPHIA, PENNSYLVANIA.

DIE FOR THE MANUFACTURE OF SIDE BEARINGS FOR RAILWAY-CARS.

SPECIFICATION forming part of Letters Patent No. 420,630, dated February 4, 1890.

Application filed November 19, 1889. Serial No. 330,896. (No model.)

*To all whom it may concern:*

Be it known that I, CHARLES T. SCHOEN, a citizen of the United States, residing at Philadelphia, in the county of Philadelphia and State of Pennsylvania, have invented a certain new and useful Improvement in Dies for the Manufacture of Side Bearings for Railway-Cars, of which the following is a full, clear, and exact description.

The object of my invention is to provide dies for the manufacture from wrought metal—preferably steel plates—of side bearings having open ends in any desired form required by railway-car construction, and which may be interchanged with the cast-metal side bearings commonly used, whereby a stronger and more durable device is obtained as compared with cast metal and at practically the same or nearly the same cost, and one which is very much lighter than cast metal.

The invention consists in dies for the manufacture of side bearings for railway-cars from wrought metal, preferably steel plate.

In the accompanying drawings, illustrating my invention, in the several figures of which like parts are similarly designated, Figure 1 is a perspective view of the plunger; and Fig. 2 a similar view of the matrix for forming the upper or body side bearing, which is shown in perspective in Fig 3. Fig. 4 is a perspective view of the plunger; and Fig. 5 a similar view of the matrix for forming the lower or truck side bearing, which is shown in perspective in Fig. 6; and Fig. 7 is a vertical cross-section of the dies of Figs. 4 and 5.

In its simplest form the upper or body side bearing will have straight edges, parallel sides, and plain body and flanges, and its cross-section will be as outlined at the left-hand end of Fig. 3. So, also, the simplest form of the lower or truck side bearing will be in complement of the upper or body bearing; but I will describe, as I have illustrated, what I believe to be the best form of my invention, and finally point out in the claims what I desire to secure by Letters Patent.

The upper side bearing has the body or bearing portion $a$ and the base or attaching flanges $b$, and its ends open. Ribs $c$ are arranged at intervals in the body and flanges to strengthen them. Dowels or teats $d$ are provided in the flanges to prevent shearing of the fastening-bolts, which are passed through the holes $e$ in the flanges. The lower side bearing is similarly made with a body or bearing portion $f$, flanges $g$, open ends, ribs $h$, dowels $i$, and bolt-holes $j$, and in addition this lower or truck side bearing may be made with a pocket or cup $k$ in its body portion to receive a lubricant. Now, the ribs and dowels and lubricant-pocket, or any of them, may be omitted without departing from my invention.

In the preferred form the upper and lower bearings, and of course the dies for forming them, will be described on arcs of a circle whose center is the king-bolt or center bearing-plates of the car, and it is only by leaving open the ends of these bearings that the curved form can be made without drawing the metal, as I now believe.

The dies for forming the upper or body side bearing consist of a plunger $l$, adapted to be inserted in a press and having the tongue $m$ and sides $n$. The matrix $o$ has a cavity $p$ to co-operate with the tongue $m$ of the plunger to form the body of the side bearings and sides $q$ to co-operate with the sides $n\,n$ of the plunger to form the flanges of the side bearing. If ribs are to be made, then the plunger will have projections $r$ and the matrix will have complemental cavities $s$, and if dowels are to be formed the dies, in addition, will have cavities $t$ in the plunger and projections $u$ on the matrix to co-operate with such cavities.

The dies for forming the lower or truck side bearing consist of a plunger $v$, adapted to be applied to a press and having a tongue $w$ and sides $x$. The matrix $y$ has a cavity $z$ to co-operate with the plunger's tongue $w$ to form the body of the side bearing and sides $a'$ to co-operate with the sides $x$ of the plunger to form the flanges of the side bearing. If ribs are to be formed, the plunger $v$ is provided with projections $b'$ to co-operate with cavities $c'$ in the matrix, and if dowels are to be made then the plunger is provided with cavities $d'$ and the matrix with projections $e'$ to co-operate to this object. If a lubricant-pocket is to be formed, then the plunger is made with a cavity $f'$, which co-operates with a projection $g'$ on the matrix.

The metal to be made into upper and lower side bearings is cut into suitable lengths, heated, and then subjected to the action of the dies. A single heat and a single set of dies may be sufficient; but I may use one or more sets of dies and heat the blank once or oftener, as may be desired. It will be observed that a flat piece of metal is used, and it is bent to shape with its ends open, and that the operation of forming the bearings is that commonly known as "stamping" or "pressing," as opposed to drawing. There is therefore little or no molecular change in the metal, and its strength consequently is not impaired. If the bearing were made with closed ends and a flange continuous around it, then drawing would have to be resorted to, and there would be molecular change and impairment of the strength of the metal of the product. In many cases it would not be possible to draw the metal to the height that would be required for interchange with present standards.

The bolt-holes may be punched out.

The side bearings herein shown and described form the subject of my application, Serial No. 330,317, filed November 14, 1889.

What I claim is—

1. Dies for stamping or pressing side bearings for railway-cars from flat sheets or blanks of wrought metal, preferably steel plate, such dies consisting of a plunger having a tongue, and a matrix having a complemental cavity to form the body of the side bearing, and both dies having sides co-operating to form the flanges, whereby the blank is bent into the finished article without impairing its strength and without drawing, substantially as described.

2. Dies for stamping or pressing side bearings for railway-cars from flat sheets or blanks of wrought metal, preferably steel plate, such dies consisting of a plunger having a tongue, and projections for ribbing the side bearings, and a matrix having complemental cavities, substantially as described.

3. Dies for stamping or pressing side bearings for railway-cars from flat sheets or blanks of wrought metal, preferably steel plate, such dies consisting of a plunger having a tongue, projections for ribbing and cavities for doweling the side bearings, and a matrix having cavities complemental to the tongue and projections, and projections co-operating with the cavities of the plunger, substantially as described.

4. Dies for stamping or pressing side bearings for railway-cars from flat sheets or blanks of wrought metal, preferably steel plate, such dies consisting of a plunger having a tongue and a cavity $f'$, and a matrix having a cavity complemental to the tongue, and a projection $g'$ complemental to the cavity of the plunger for forming a lubricant-pocket in the lower or truck side bearing, substantially as described.

5. Dies for stamping or pressing side bearings for railway-cars from flat sheets or blanks of wrought metal, preferably steel plate, such dies consisting of a plunger having a tongue, sides, ribbing projections, doweling-cavities, and a pocketing-cavity and a matrix having a tongue-cavity, sides, ribbing-cavity, doweling projections, and a pocketing projection, substantially as described.

6. Dies for stamping or pressing side bearings for railway-cars from flat sheets or blanks of wrought metal, preferably steel plate, such dies consisting of a plunger having a tongue and a matrix having a complemental cavity to form the body of the side bearing, and both dies having sides co-operating to form the flanges, whereby the blank is bent into the finished article without impairing its strength and without drawing, the said plunger and matrix being curved longitudinally in the arc of a circle described from a center coincident with the king-bolt or center-bearing plates of the car for which the side bearings are designed, substantially as described.

In testimony whereof I have hereunto set my hand this 18th day of November, A. D. 1889.

CHARLES T. SCHOEN.

Witnesses:
EDWARD P. HIPPLE,
WM. H. SCHOEN, Jr.